United States Patent [19]

Emory

[11] 4,269,444
[45] May 26, 1981

[54] APPARATUS FOR REDUCING AERODYNAMIC DRAG

[76] Inventor: Jack L. Emory, P.O. Box 2916, Taos, N. Mex. 87571

[21] Appl. No.: 98,426

[22] Filed: Nov. 29, 1979

Related U.S. Application Data

[63] Continuation of Ser. No. 906,704, May 17, 1978, abandoned.

[51] Int. Cl.$^3$ ............................................... B60J 1/04
[52] U.S. Cl. ..................................... 296/1 S; 105/2 R
[58] Field of Search ...................... 296/1 S; 180/313; 105/2 R

[56] References Cited

U.S. PATENT DOCUMENTS

| | | | |
|---|---|---|---|
| 2,118,127 | 5/1938 | Wulle | 105/2 R |
| 2,514,695 | 7/1950 | Dempsey | 296/1 S |
| 3,425,740 | 2/1969 | DeVanghn | 296/1 S |
| 3,697,120 | 10/1972 | Sound | 296/1 S |
| 3,977,716 | 8/1976 | Whited | 105/2 R |
| 4,021,069 | 5/1977 | Hersh | 296/1 S |

*Primary Examiner*—Robert R. Song
*Attorney, Agent, or Firm*—James A. Wong

[57] ABSTRACT

A trailer body for a tractor trailer rig having a configuration that provides a degree of lift due to the passage of air over the trailer, and also minimizes the air drag at highway speeds.

6 Claims, 8 Drawing Figures

APPARATUS FOR REDUCING AERODYNAMIC DRAG

This is a continuation of application Ser. No. 906,704, filed May 17, 1978, now abandoned, which is continuation-in-part of application Ser. No. 797,291, filed May 16, 1977, and now abandoned.

This invention relates to apparatus for reducing the aerodynamic drag of a moving vehicle and more particularily to apparatus for reducing the air drag on trailer trucks and other similar vehicles which present a substantially high aerodynamic resistance.

In the case of trucks, trailers and other similar vehicles, the optimum useful space within the load bearing portion of the vehicle is achieved when the body of the vehicle is substantially box-like in shape. When utilizing such a shape, however, the forward face or surface of the vehicle presents an aerodynamically resistant surface which results in a high aerodynamic drag when the vehicle is moving, particularly at speeds in excess of 50 mph. The aerodynamic resistance of the vehicle results in increased operating costs and can adversely influence the handling characteristics of the vehicle particularly in quartering winds and crosswinds.

Various prior art devices have been suggested which are adapted to be carried either by the trailing element or cargo body of the vehicle or for mounting on the cab of the vehicle for deflecting impinging air around the cargo body to reduce the aerodynamic drag. Thus, for example, Saunders in U.S. Pat. No. 3,241,876 suggests the placing of a baffle on the cab of the vehicle which deflects air upwardly over the cargo holding portion of the vehicle. Such apparatus requires reinforcement of the cab roof and is of no substantial help in improving the handling characteristics of the vehicle in a crosswind. U.S. Pat. No. 697,120, also Saunders, discloses a device which is utilized in the gap between a tractor and trailer to reduce crosswind drag. This device may be utilized in combination with the air deflection baffle disclosed in U.S. Pat No. 3,241,876 to reduce the air resistance of the vehicle in both head winds and crosswinds.

Other drag reducing apparatus employed in the prior art includes the provision of air vanes or fins around the edges of the cargo carrying portion of the vehicle to deflect the impinging air stream. Operating on a different principle is a device disclosed by Dempsey in U.S. Pat. No. 2,514,695 which comprises a substantially large blister carried on the forward face of a trailer and which blister is provided with an opening for collecting impinging air, and a passage for the air extending to the rear portion of the trailer.

The Hirsh patent No. 4,021,009 shows an "aerodynamic fairing" having a generally circular shape in plan, and a steeply upwardly sloping portion in elevation extending from a point of "maximum extension". The point of maximum extension being at the level of the top of the tractor cab only at the center of the vehicle.

Other prior art devices include means for enclosing the gap between the tractor and trailer of an articulated cargo carrying vehicle to reduce the resistance of the combination. Such devices restrict vehicular operation, particularly the turning radius, and are unacceptable for commercial vehicles.

The present invention does not follow the accepted practice as shown in the prior art of providing a bulbous extension on the front end of the trailer body. The trailer body according to the present invention includes a forward portion at the front of an upper surface extending entirely across the forward end of the trailer body presenting in plan a "square" forward end. In elevation the forward and element or portion has a top surface or wall having the contour as though it was the forward top surface of an airplane wing. The lower surface of the forwardly extending portion being only high enough to clear the tractor cab when the rig is turning at its minimum radius. There may be a "plow shaped" portion below the rather flat lower surface of the forwardly extending element as is illustrated in the accompanying drawings.

The upper surface of the forward element or portion preferably blends rearwardly and downwardly into a curved convex surface forming the top surface or wall of the trailer body and having the curvature of the upper rear surface of a high lift airplane wing.

Depending on the length of the trailer body the upper surface of the trailer body may have a second upwardly extending portion having a forward surface corresponding to the upper forward surface of an airplane wing blending rearwardly and downwardly toward the rear of the trailer body and having the curvature of the rearward upper surface of an airplane wing.

While it is preferred that immediately rearwardly of the forwardly extending element a surface curved into the shape of the upper rear surface of an airplane wing be provided, it has been found that substantial benefit accrues from use of the "air foil section" at the front of the trailer body merging into the flat trailer body roof, especially where the trailer body, in use, slopes from front to rear.

It is believed that with use of the present invention, a stabilizing lift, is provided on the trailer body which also reduces the effective weight of the trailer on the highway surface at high speeds.

An object of the present invention is to provide an aerodynamic structure for use especially on trailers of tractor-trailer rigs that stabilizes the rigs and reduces the air drag.

Other and further objects and advantages will appear from the following specification taken with the accompanying drawing in which.

Figure 1:
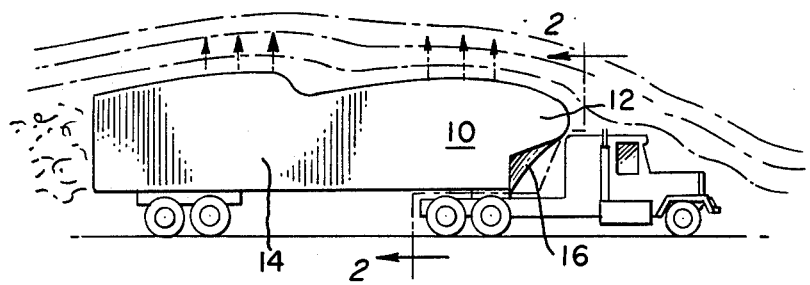
FIG. 1 is a side view of a tractor trailer rig of the present invention.
Figure 2:
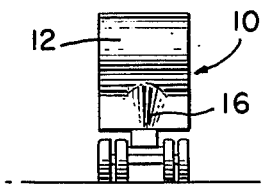
FIG. 2 is a view, from the front, of the trailer of the rig shown in FIG. 1.
Figure 3:
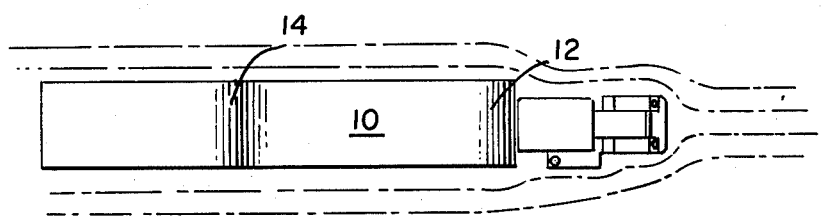
FIG. 3 is a plan view of the rig of FIG. 1.

As shown in FIG. 1, the forward end of trailer body 10 is provided with a forward portion 12. The shape of this forward portion 12 is important. In plan, as seen in FIG. 2 it is "square", that is it extends the full width of the trailer body from one side wall to the other. In elevation, as seen in FIG. 1, the upper surface of forward portion 12 is shaped as the upper surface of a high-lift, slow-speed airplane wing.

From the front end of the trailer body 10, the surface of the forward portion 12 is continued curving convexly rearwardly and downwardly to follow the airplane wing shape defined by the top surface of the forward portion 12.

A second air foil surface 14 is provided on long trailer bodies having a shape of the upper surface of a high-lift, slow-speed airplane wing.

Figure 4:
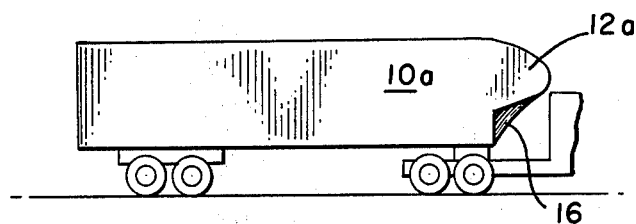
FIG. 4 is a sideview of a simplified rig.

The lower surface of the forwardly extending portion of the trailer, as seen in FIGS. 1 and 4 at 16 must clear the cab of the tractor element with which the trailer is to be used, but the clearance should be a minimum compatible with manouverability of the rig. The front bulkhead of the trailer may be shaped as shown at 16 in FIGS. 1,2,4, and 5 or other shapes to more or less fill the space between the tractor and the trailer.

Figure 5:
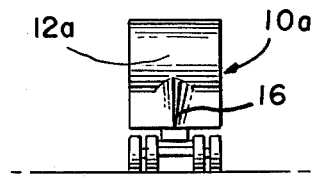
FIG. 5 is a view from the front of the trailer of the rig shown in FIG. 4.

A simplified example of the invention is shown in FIGS. 4 and 5 where only the forward and portion 12a similar to the forward portion 12 of FIG. 1 is provided. Portion 12a extends entirely across the front end of the trailer, its ends flush with the side walls of the trailer and has an upper surface formed as the forward upper surface of a high-lift slow-speed airplane wing.

Figure 6:
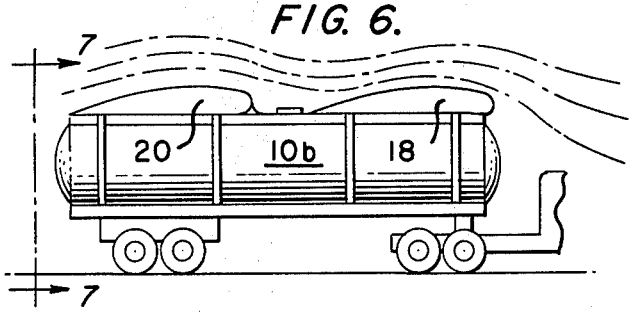
FIG. 6 is a side view showing the application of the invention to a tank trailer.
Figure 7:
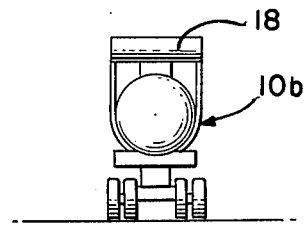
FIG. 7 is a front view of the tank trailer of FIG. 6.
Figure 8:
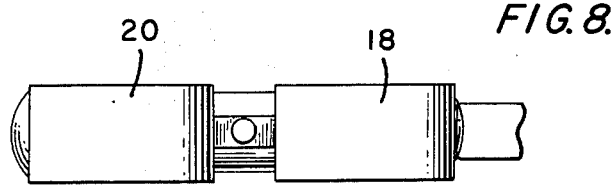
FIG. 8 is a plan view of the tank trailer of FIG. 6.

FIGS. 6, 7, and 8 show the application of the present invention to a tank trailer. High-lift, slow-speed airplane wing sections 18 and 20 are mounted on the tank, 10b to be at the level of or above the top of the tractor cab.

It has been found that the use of air foil shapes which tend to exert a lifting force to the trailer eliminates the recirculation of air on the top of the trailer, so that the air drag is reduced and the lift factor exerted by the surfaces reduces the load on the tires and on the road surface.

In test runs on tractor-trailer rigs incorporating this invention, the experienced test driver reported improved stability, and that with a head wind the rig was easy to handle and pull. In a fuel test a gain of one half mile per gallon of fuel consumed was reported.

It will be understood that while the forms of the invention described herein constitute the preferred embodyment, various changes and arrangements may be made without departing from the spirit or scope of the invention herein disclosed, therefor:

I claim:

1. A cargo carrying vehicle body such as a trailer of a tractor trailer rig comprising, a wheel-mounted floor portion, two side wall portions, an upper wall, and a forward portion, wherein at least a first portion of said upper wall and said forward portion together form in side elevational view a curved contour extending for the entire width of said trailer from one of said two side wall portions to the other of said two side wall portions to define an airplane wing section having a "square" appearance in plan view which provides a high-lift surface with low drag effect, and said forward portion also has a lower surface of such height as to clear a cab for towing the tractor during turns or maneuvers.

2. The vehicle body as defined in claim 1, wherein said forward portion extends rearwardly and downwardly and blends into said upper wall.

3. The vehicle body as defined in claim 2, wherein the curved contour formed by said upper wall and said forward portion is convex.

4. The vehicle body as defined in claim 3, wherein said upper wall comprises at least a second portion defining a second airplane wing section of high-lift behind the airplane wing section defined by said first portion and said forward position.

5. The vehicle body as defined in claim 1, wherein said vehicle body is in the form of a tank trailer.

6. The vehicle body as defined in claim 5, wherein said upper wall comprises at least a second portion defining a second airplane wing section of high-lift behind the airplane wing section defined by said first portion and said forward portion.

* * * * *